(12) United States Patent
Keener (10) Patent No.: US 7,150,594 B2
(45) Date of Patent: Dec. 19, 2006

(54) HYBRID FASTENER APPARATUS AND METHOD FOR FASTENING

(75) Inventor: Steven G. Keener, Trabuco Canyon, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/796,364

(22) Filed: Mar. 9, 2004

(65) Prior Publication Data

US 2005/0201845 A1    Sep. 15, 2005

(51) Int. Cl.
*F16B 35/04*     (2006.01)

(52) U.S. Cl. .......................... 411/34; 411/43; 411/901; 411/908

(58) Field of Classification Search ................ 411/34, 411/38, 43, 900–904, 908
See application file for complete search history.

(56) References Cited

U.S. PATENT DOCUMENTS

| | | | |
|---|---|---|---|
| 4,457,652 A * | 7/1984 | Pratt ........................... 411/38 |
| 4,478,543 A * | 10/1984 | Lyon ........................... 411/34 |
| 4,659,268 A | 4/1987 | Del Mundo et al. |
| 4,681,497 A * | 7/1987 | Berecz ........................ 411/377 |
| 4,717,302 A | 1/1988 | Adams et al. |
| 4,778,637 A | 10/1988 | Adams et al. |
| 4,859,128 A * | 8/1989 | Brecz et al. .................. 411/43 |
| 4,861,211 A | 8/1989 | Dunsmore |
| 4,877,362 A * | 10/1989 | Berecz et al. ................. 411/34 |
| 5,098,240 A * | 3/1992 | Gapp et al. .................. 411/424 |
| 5,354,160 A * | 10/1994 | Pratt et al. ................... 411/501 |
| 5,569,008 A * | 10/1996 | Chapkovich ................. 411/383 |
| 5,614,037 A | 3/1997 | Keener |
| 5,858,133 A | 1/1999 | Keener |
| 5,922,472 A | 7/1999 | Keener |
| 5,944,918 A | 8/1999 | Keener |
| 6,171,649 B1 | 1/2001 | Keener et al. |
| 6,274,200 B1 | 8/2001 | Keener et al. |
| 6,494,972 B1 | 12/2002 | Keener et al. |
| 6,499,926 B1 | 12/2002 | Keener |
| 6,796,759 B1 * | 9/2004 | Aasgaard ..................... 411/29 |

OTHER PUBLICATIONS

Daniel K. Debski, Marek A. Debski, Krzysztof M. Goloś; Composite Joints Of Aerostructures; Transactions of the Institute of Aviation, No. 170-171; pp. 3-27; availiable at http://www.ilot.edu.pl/STRANG/Designs/CJoA.pdf.

* cited by examiner

*Primary Examiner*—Flemming Saether
(74) *Attorney, Agent, or Firm*—Alston & Bird LLP (57) ABSTRACT

A composite fastener and method for fastening structural members are provided. The fastener is formed at least partially of a composite material. For example, at least one component of the fastener can be formed of a composite material and the remaining components of the fastener can be formed of a metallic material. The fasteners can be compatible with the materials of the structural members to be fastened or joined, such as where all or at least one of the structural members are formed of a composite material. In some cases, the fastener can be installed blindly from one side of the structural members with no or limited access to the opposite side.

27 Claims, 2 Drawing Sheets

HYBRID FASTENER APPARATUS AND METHOD FOR FASTENING

BACKGROUND OF THE INVENTION

1) Field of the Invention

The present invention relates to composite fasteners for fastening structural members, i.e., fasteners formed at least partially of a composite material, such as hybrid fasteners formed of a combination of composite and metallic materials, and/or blind composite fasteners.

2) Description of Related Art

High-strength composite materials are increasingly being used in the manufacture of various types of structural members due to improved physical properties and economic availability of the materials. Along with this increased use, the composite materials are more commonly being used in conjunction with metallic components in situations that require structural integrity and fatigue resistance. For example, structural members for aerospace applications that are formed of high-strength composites such as carbon/epoxy, polyaramid/epoxy, or glass/epoxy composites are mechanically fastened using high-strength metallic aerospace fasteners. Such fasteners are typically formed of metallic materials such as titanium and stainless steels that are different from the composite materials of the structural members. Therefore, the fasteners often have physical characteristics that are dissimilar to or incompatible with the composite materials of the structural members being fastened. In some cases, the use of dissimilar materials can result in delamination of the composite structural members caused by the fastener under installation and operational loads, inadequate sealing surrounding the fastener and therefore leakage of fluids through the joined components, inadequate electrical continuity between the composite components and arcing across the gaps surrounding the fasteners, galvanic corrosion between the fasteners and components at the composite joint, increased weight of the joined components, and/or nonuniform coefficients of thermal expansion between the fastener material and the surrounding composite material.

Still, metallic fasteners can also be provided with an organic corrosion-inhibiting coating. The metallic fasteners provide adequate strength, and the organic coating improves the compatibility of the metallic fastener with the joined composite materials. However, the dissimilarity of the metallic fastener material properties and the composite materials joined in the assembly can still result in delamination, inadequate electrical continuity, galvanic corrosion, and nonuniform expansion between the materials.

Some fasteners formed of composite materials such as PEEK™ can be subject to the same problems, as noted above. Further, current fasteners formed of composite materials are generally not adapted for blind installation. For example, the installation of two-piece composite fasteners such as threaded pins or bolts generally requires the threaded pin or bolt to be inserted from a first side of the structural members being joined with access for installation of a nut at the opposite side. Similarly, one-piece composite rivets generally must be inserted from a first side of the structure to be assembled and then upset at the opposite side. Such fasteners, either one-piece or two-piece, generally cannot be used for fastening applications in which one side of the structural members is inaccessible. Further, even if both sides are accessible, access to both sides of the fastener can require additional tooling and/or processing steps.

Thus, a continued need exists for improved fasteners that can be used with either composite or metallic and composite structural members for aerospace and non-aerospace applications. Preferably, the fasteners should be adaptable for fastening multiple composite structural members or a combination of composite or metallic structural members while reducing or eliminating the occurrence of problems relating to delamination, electrical continuity, galvanic corrosion, and nonuniform expansion that are associated with metallic fasteners and conventional composite fasteners. Further, the fasteners should be adaptable for blind installation, that is, an installation having no or limited access from one side of the structure to be assembled.

SUMMARY OF THE INVENTION

The present invention provides fasteners and methods for fastening non-metallic and metallic structural members. The fasteners can be formed at least partially of composite materials, e.g., as a hybrid fastener formed partially of a composite material and partially of a metallic material. The fasteners can be compatible with the materials of the structural members to be fastened, such as where one or more of the structural members is formed of a composite material. Thus, the composite material of the fastener can reduce the galvanic corrosion that might otherwise result if a conventional metallic fastener were used. Further, the composite material of the fastener can have characteristics similar to or the same as those of the structural members, thereby improving the electrical continuity of the structural members, reducing the likelihood of delamination, and reducing differentials in thermal expansion coefficients that might otherwise occur. In some cases, the fastener can be installed blindly, i.e., the fastener can be disposed and deformed from a single side of the structural members without requiring access to the opposite side of the structural members.

According to one embodiment, the present invention provides a composite-metallic hybrid fastener for installation in an aperture through structural members for fastening the structural members. The hybrid fastener includes a composite sleeve and a metallic stem. For example, the composite sleeve can be formed of a composite material having carbon or fiberglass reinforcing fibers disposed in a polymeric resin matrix, and the stem can be formed of titanium or titanium-alloy material. The sleeve extends from a first side to a second side and defines a head at a second side and an aperture through the sleeve. A cross-sectional dimension of the head is at least as great as a cross-sectional dimension of the aperture of the structural members. The stem includes a shank with a deformable head at a first end thereof, such as an annular portion that extends around the shank. The shank can be disposed through the structural members and the sleeve, and the head of the stem is capable of being compressed toward the sleeve and thereby deformed to a cross-sectional dimension that is at least as great as the cross-sectional dimension of the aperture through the structural members. For example, the shank and the aperture through the sleeve can define corresponding or mating threads so that the shank can be screwed into the sleeve to deform the head of the stem against the sleeve. Thus, the structural members can be fastened between the head of the sleeve and the deformable end of the stem.

The present invention also provides a blind fastener that is formed at least partially of a composite material. The fastener has a shank with first and second heads at opposite ends thereof. The second head has a cross-sectional dimension that is at least as great as a cross-sectional dimension of the aperture. The first head has a cross-sectional dimension less than the cross-sectional dimension of the aperture so that the first head can be inserted through the aperture of the structural members from the first side to the second side of the structural members. The first head is deformable to a cross-sectional dimension greater than the cross-sectional dimension of the aperture to fasten the structural members between the two heads. The first head can be deformed by a blind adjustment or functioning of the second head and the shank at the first side of the structural members.

In any case, the fastener can also include a plastic insert between the stem and the sleeve that forms a seal therebetween when the head of the stem is deformed. In addition, or alternative, one or both of the stem and the sleeve can be pre-coated with a curable organic coating. Further, the stem can define a breakneck feature such as a circumferential groove that is configured to fail in tension after the head of the stem has been fully deformed and exerts a pre-established minimal tensile load.

According to one method of the present invention, a fastener is used to fasten and assemble structural members. The fastener defines a shank with heads at opposite ends thereof, and the fastener is formed at least partially of a composite material. For example, the second head can be formed of a composite material and the shank can be formed of metal. The shank is disposed in an aperture so that the second head is disposed at a first side of the structural members and the first head is disposed at a second side of the structural members opposite the first side. The second head has a cross-sectional dimension greater than a cross-sectional dimension of the aperture, and the first head is deformed to a cross-sectional dimension greater than the cross-sectional dimension of the aperture, thereby fastening the structural members between the two heads. The fastener can be blindly disposed and deformed. That is, the fastener can be disposed from the first side of the structural members, and the first head can also be deformed or upset from the first side of the structural members.

According to one aspect of the invention, a plastic insert or metallic lock or locking ring of the locking feature is disposed between the stem and the sleeve to form a seal or locking feature between the two components. Additionally or alternatively, the fastener can be pre-coated with a curable organic coating. Further, the shank can be broken so that a portion of the shank can be removed from the fastener after the first head is deformed.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
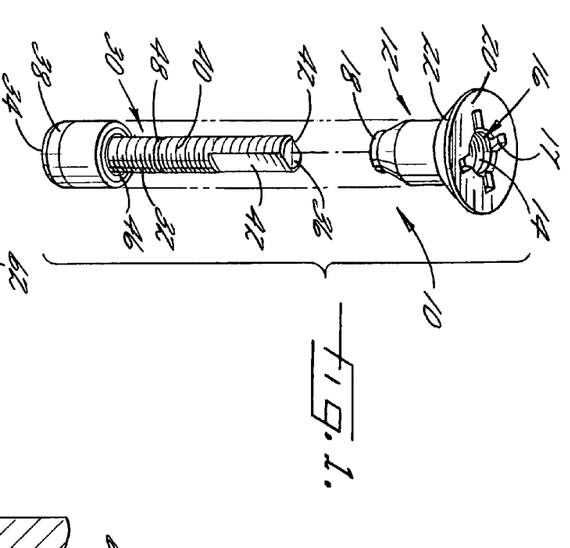
FIG. 1 is an exploded perspective view illustrating a composite-metallic hybrid fastener according to one embodiment of the present invention.
Figure 2:
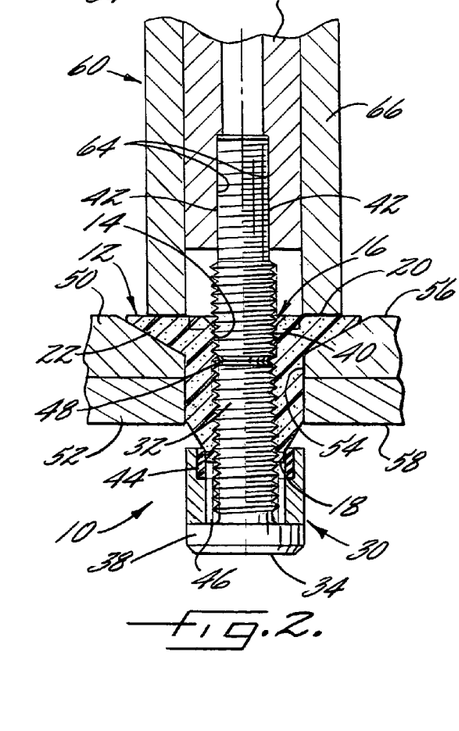
FIG. 2 is a section view illustrating the composite-metallic hybrid fastener of FIG. 1 disposed through two structural members.
Figure 3:
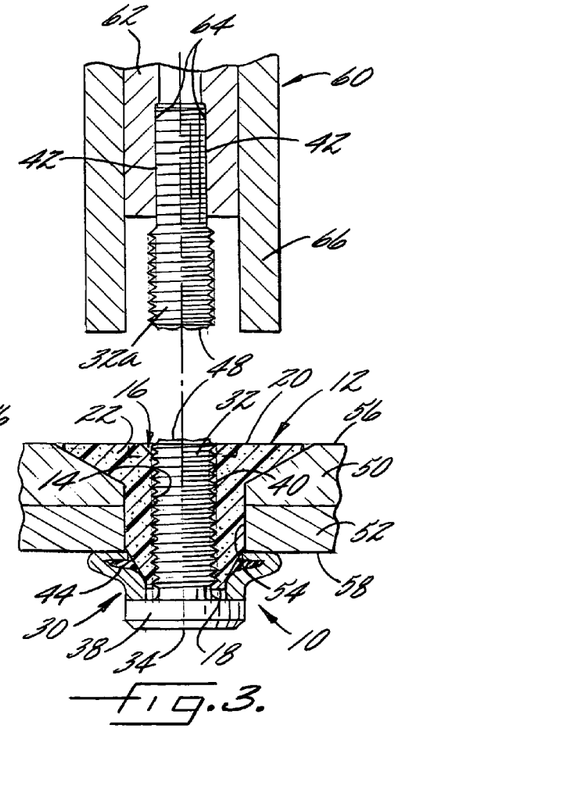
FIG. 3 is a section view illustrating the composite-metallic hybrid fastener of FIG. 1 after the first head of the fastener has been deformed to fasten the structural members together.

Referring now to the drawings, and in particular to FIG. 1, there is illustrated a composite-metallic hybrid fastener 10, which can be used for fastening structural members. In particular, as shown in FIGS. 2 and 3, the fastener 10 can be installed in an aperture 54 that extends between first and second sides 56, 58 of the structural members 50, 52 to thereby fasten the structural members 50, 52. The fastener 10 is compatible with various types of structural members. For example, the fastener 10 can be used to fasten multiple composite structural members, or a combination of at least one composite structural member and at least one metallic structural member. That is, each of the structural members 50, 52 can be a metallic member or a non-metallic member such as a composite member. It is also appreciated that any number of structural members can be fastened with the fastener 10. For example, two or more structural members 50, 52 can be positioned in an overlapping configuration, as shown in FIG. 2, and the fastener 10 can be disposed therethrough. In some cases, the fastener 10 can fasten a single structural member, e.g., a structural member that is folded, curved, or otherwise bent so that two or more portions of the member are positioned in an overlapping configuration. As such, reference to the fastening of structural members shall include both the fastening of two or more distinct structural members, and the fastening of two or more portions of a single structural member. In any case, the structural members 50, 52 can be used in various applications including, but not limited to, aerospace vehicles and structures, other vehicles such as automobiles or marine vehicles, building structures, and the like.

The fastener 10 illustrated in FIG. 1 is an exemplary fastener according to the present invention, but the fastener 10 can alternatively be configured as any of a number of other fastening devices. As shown in FIG. 1, the fastener 10 includes a sleeve 12 and a stem 30. The stem 30 has a shank portion 32 that extends between first and second ends 34, 36. The first end 34 defines a head 38 and the second end 36 is configured to be inserted through an aperture 16 defined by the sleeve 12. The sleeve 12 can engage the shank 32, e.g., by virtue of corresponding threads 14, 40 provided on the inner surface of the aperture 16 extending through the sleeve 12 and on the outer surface of the shank 32 of the stem 30, respectively. More particularly, the stem 30 can be engaged to the sleeve 12 by inserting the second end 36 of the shank 32 into the aperture 16 and screwing the shank 32 therethrough until the head 38 contacts the sleeve 12.

The fastener 10 is formed partially of a metallic material and partially of a non-metallic material such as a composite material. More particularly, the stem 30 of the fastener 10 can be formed of a metallic material such as titanium, aluminum, steel, or alloys thereof. The sleeve 12 of the fastener 10 can be formed of a composite material.

The term "composite material," generally refers to a fiber-reinforced material disposed in, or impregnated with, a resin matrix material. The resin matrix material can be any of a number of thermoplastic or thermoset polymeric resins. Exemplary thermosetting resins include allyls, alkyd polyesters, bismaleimides (BMI), epoxies, phenolic resins, polyesters, polyurethanes (PUR), polyurea-formaldehyde, cyanate ester, and vinyl ester resin. Exemplary thermoplastic resins include liquid-crystal polymers (LCP); fluoroplastics, including polytetrafluoroethylene (PTFE), fluorinated ethylene propylene (FEP), perfluoroalkoxy resin (PFA), polychlorotrifluoroethylene (PCTFE), and polytetrafluoroethylene-perfluoromethylvinylether (MFA); ketone-based resins, including polyetheretherketone (PEEK™, a trademark of Victrex PLC Corporation, Thorntons Cleveleys Lancashire, UK); polyamides such as nylon-6/6, 30% glass fiber; polyethersulfones (PES); polyamideimides (PAIS), polyethylenes (PE); polyester thermoplastics, including polybutylene terephthalate (PBT), polyethylene terephthalate (PET), and poly(phenylene terephthalates); polysulfones (PSU); poly(phenylene sulfides) (PPS).

PEEK™ polymer is relatively easy to process and has good chemical resistance, abrasion resistance, high-temperature resistance, hydrolysis resistance, flame resistance with low smoke and toxic gases, excellent electrical properties, and excellent resistance to gamma rays. As with many of the composite polymers, PEEK™ polymer may be mixed with other resins or fillers, such as glass, aramid, or carbon fibers, through known methods, such as via melt compounding.

The reinforcement material, which can be provided as fibrous pieces or strands, tows, woven or nonwoven mats, and the like, can be any of a variety of fibrous materials such as fiberglass, metal, minerals, conductive or nonconductive graphite or carbon, nylon, aramids such as Kevlar®, a registered trademark of E. I. du Pont de Nemours and Company, and the like.

The resin matrix and reinforcement material can be selected according to the desired mechanical, physical, chemical, thermal, and electrical requirements of any particular application. For example, some fiber additives provide additional strength, while others provide enhanced electromagnetic and radio frequency shielding. Exemplary composite combinations include carbon/epoxy, Kevlar®/epoxy, and fiberglass/epoxy. Depending on the polymer of the matrix, different amounts of fiber reinforcement provide improved tensile strength, dimensional stability, cut-through resistance, flex modulus, and resistance to stress cracking, creep, warpage, and heat deflection or expansion. By way of example, 20% to 30% glass-filled PFA and PEEK™ fluoropolymers have been found to have superior mechanical properties resulting from fiber reinforcement with the outstanding thermal, chemical, and electrical properties of these polymeric resins. Glass, carbon, or titanate fibers generally can be compounded into fluoropolymers at levels up to about 30%. In addition, additives can be used to increase flame retardancy, to improve lubricity or, in the case of pigments, simply to change the color of the final product. The operations for forming components of composite materials generally include disposing the reinforcement material in the matrix material and then curing the matrix material. Various particular forming techniques can be used to make components such as the composite sleeve 12 of the fastener 10. These techniques are generally known in the art.

The sleeve 12 is configured to be installed in the aperture 54 defined by the structural members 50, 52. In particular, the sleeve 12 extends between first and second sides 18, 20. The first side 18 of the sleeve 12 can be smaller than the aperture 54 through the structural members 50, 52 so that the sleeve 12 can be at least partially inserted into the aperture 54. However, the second side 20 of the sleeve 12 defines a head portion 22 with a cross-sectional dimension that is similar to or greater than the corresponding cross-sectional dimension of the aperture 54. For example, the head 22 and the aperture 54 are typically circular, with the head 22 having a diameter that is similar to or greater than the diameter of the aperture 54. Thus, the head 22 is secured against the first side 56 of the structural member 50. As shown in FIG. 2, each of the head 22 of the sleeve 12 and the aperture 54 through the structural members 56, 58 can have a correspondingly tapered or flared shape so that the second side 20 of the sleeve 12 is substantially flush with the first side 56 of the structural member 50 when the sleeve 12 is disposed in the aperture 54. Thus, as shown in FIG. 2, the sleeve 12 can be disposed in the aperture 54 so that the sleeve 12 extends from the first side 56 of the structural member 50 through the aperture 54 to extend outwardly from the second side 58 of the structural member 52. It is appreciated, however, that the sleeve 12 in other embodiments can be otherwise configured.

The head 38 of the stem 30 also has a cross-sectional dimension that is smaller than the corresponding cross-sectional dimension of the aperture 54 through the structural members 50, 52. For example, both the head 38 of the stem 30 and the first side 18 of the sleeve 12 can have a diameter that is about equal to or less than the diameter of the aperture 54 through the structural members 50, 52. Thus, the stem 30 can be threaded into the sleeve 12, as shown in FIG. 2, and the fastener 10 can be inserted through the aperture 54 of the structural members 50, 52 so that the head 38 of the stem 30 is disposed at the second side 58 of the structural member 52 and the head 22 of the sleeve 12 is disposed at the first side 56 of the structural member 50.

The shank 32 of the stem 30 can define connection features opposite the head 38, such as flat grip surfaces 42 on opposite sides of the shank 32, which can be engaged by a conventional rotatable tool 60. For example, the tool 60 shown in FIG. 2 includes a gripping member 62 with opposed surfaces 64 that engage the grip surfaces 42 of the shank 32. The tool 60 also has an outer tubular portion 66 that can be pressed against the sleeve 12 to prevent the sleeve 12 from moving in the aperture 54. For example, the outer tubular portion 66 can mate or engage with slots 17 or torque recess features on the second side 20 of the sleeve 12 to prevent the sleeve 12 from rotating as torque is applied during the installation of the fastener 10. The gripping member 62 is rotatable within the outer tubular portion 66. Thus, the tool 60 can be engaged to the fastener 10 by inserting the shank 32 of the stem 30 between the opposed surfaces 64 of the gripping member 62 and advancing the tool 60 toward the fastener 10 until the outer tubular portion 66 contacts the second side 20 of the sleeve 12.

The fastener 10 is then installed by rotating the stem 30 relative to the sleeve 12 so that the head 38 of the stem 30 is deformed, or upset, against the sleeve 12 and/or the second side 58 of the structural member 50. For example, as shown in FIG. 2, the first side 18 of the sleeve 12 can extend from the aperture 54 through the structural members 50, 52, and the first side 18 can define a tapered portion. As the shank 32 is rotated relative to the sleeve 12, the stem 30 is adjusted into the sleeve 12 and toward the tool 60. The head 38 of the stem 30 can define various deformable configurations, i.e., such that the head 38 is capable of being upset. For example, as shown in FIG. 2, the head 38 defines an annular portion that extends circumferentially around the shank 32. As the stem 30 is tightened against the sleeve 12, the head 38 is received onto the tapered first side 18 of the sleeve 12 and the head 38 is deformed, or upset, as shown in FIG. 3. Thus, the structural members 50, 52 are compressed between the heads 22, 38 of the sleeve 12 and the stem 30 and fastened therebetween.

As shown in FIGS. 2 and 3, a plastic insert 44 can be provided in a gap 46 between the annular portion of the head 38 of the stem 30 and the shank 32. The insert 44 can be deformed between the stem 30 and the sleeve 12 during deformation of the head 38 of the stem 30. As shown in FIG. 3, the insert 44 can form a seal between the stem 30 and the sleeve 12 such that the fastener 10 seals the aperture 54. The fastener 10 can also be formed without the plastic insert 44, and the fastener 10 can seal the aperture 54 even without the insert 44. In either case, the fastener 10 can be configured to seal the aperture 54 and prevent liquid or gas from flowing through the aperture 54 of the structural members 50, 52 or into the aperture 54 to contact the various inner layers of the structural members 50, 52. Such sealing can be achieved even without the use of a wet polysulfide sealant material on the surfaces of the composite structural members 50, 52 being fastened, as is used in one conventional riveting operation.

The shank 32 can also define a breakneck feature 48, e.g., a circumferential groove around the shank 32 that defines a weakened portion of the shank 32. The breakneck feature 48 can be designed to fail under a predetermined minimum tensile load so that when the head 38 of the stem 30 is sufficiently deformed, the required torque for further rotation of the stem 30 is sufficient to break the shank 32 at the breakneck feature 48. Thus, the portion 32a of the shank 32 opposite the head 38 from the breakneck feature 48 can be removed from the fastener 10 during installation of the fastener 10, as shown in FIG. 3.

As described in the foregoing exemplary operation of installation, the fastener 10 is adapted for a blind installation. That is, the fastener 10 can be disposed in the aperture 54 and deformed to fasten the structural members 50, 52 from a single side of the structural members 50, 52. In particular, the stem 30 can be screwed into the sleeve 12, as shown in FIG. 2, and the fastener 10 can then be inserted into the aperture 54 of the structural members 50, 52 from the first side 56 of the structural members 50, 52. Thereafter, the tool 60 can be used to deform the head 38 of the stem 30 from the first side 56 of the structural members 50, 52. Thus, the head 38 of the stem 30 is deformed and the structural members 50, 52 are fastened without requiring access to the second side 58 of the structural members 50, 52. In this regard, the fastener 10 can be used to fasten structural members 50, 52 even when it is impractical or impossible to access both sides of the structural members. Further, even if both sides of the structural members are accessible, such a blind installation allows the fastener 10 to be installed without providing tooling to both sides, thereby potentially simplifying the tooling for installation and the installation process.

According to one embodiment of the present invention, one or more of the components of the fastener 10 can be pre-coated. "Pre-coated" or "pre-coating" of a fastener generally refers to a process by which a coating is applied to all or part of the fastener during its fabrication before the fastener is ready for use. For example, the sleeve 12 and/or the stem 30 can be pre-coated with a curable organic coating by spraying, dipping, brushing, or otherwise applying a solution of the coating material. If the solution includes a carrier liquid, the carrier liquid can be evaporated, leaving a layer of the coating that can be cured. The coating material can be provided to protect the material of the sleeve 12 and/or the stem 30 from corrosion, such as conventional electrolytic corrosion, galvanic corrosion, or stress corrosion. Pre-coating of composite fasteners with cured organic coatings is further described in U.S. application Ser. No. 10/792,174, entitled "Method For Preparing Pre-Coated, Composite Components and Components Prepared Thereby," filed Mar. 3, 2004 and assigned to the assignee of the present application, the entirety of which is incorporated herein by reference. Pre-coating of metallic fastener components with curable organic coatings is further described in U.S. Pat. No. 6,499,926, entitled "Fastener Apparatus and Method of Fastening Non-Metallic Structures," which issued Dec. 31, 2002 and is assigned to the assignee of the present application, the entirety of which is also incorporated herein by reference.

It is appreciated that the blind hybrid composite fastener 10 of the present invention, which includes the combination of non-metallic (e.g., composite) and metallic components, can be lighter in weight than a similar fastener formed entirely of metallic materials. That is, the non-metallic, composite sleeve 12 of the fastener 10 shown in the figures can be lighter than a similar sleeve formed of various types of metal by virtue of the reduced material density. For example, according to one embodiment of the blind hybrid composite fastener 10 of the present invention, the combined weight of 1000 of the fasteners 10 is between about 2.1 and 2.3 lbs. In comparison, 1000 conventional metallic fasteners typically weigh between about 4 and 7 lbs. In addition, in cases where the fastener 10 is used to secure at least one structural member 50, 52 that is formed of a composite material, the sleeve 12 can be formed of a composite material that is the same as, similar to, or otherwise compatible with the composite material of the composite structural member to be joined, thereby providing enhanced performance, such as improved corrosion protection, compatible coefficients of thermal expansion, reduced matrix damage, reduced electrical arcing, and the like to the joined structural members and/or the fastener 10 as compared to composite structural members that are fastened with metallic fasteners. In addition or alternative to the compatibility between the material of the composite sleeve 12 and the structural members 50, 52, the composite sleeve 12 can be pre-coated so that the outer surfaces of the sleeve 12 are similar to or provide enhanced compatibility with the structural members 50, 52 and/or the fastener's metallic stem 30.

The use of composite materials in the fastener 10 can also improve a number of other properties or characteristics of the fasteners 10, as desired for particular applications. For example, the blind composite or hybrid fasteners 10 of the present invention can be used for aircraft and can result in reduced radar visibility of the aircraft. The fasteners 10 can also provide continuous electrical continuity to the composite structural members 50, 52 and thereby reduce the risk of arcing between the fasteners 10 and the structural members 50, 52 if the aircraft is struck by lightning or otherwise subjected to large electrical potentials. Further, the sleeve 12 and, hence, the fastener 10, can exhibit bearing stress and strain characteristics that are similar to the composite structural members 50, 52, thereby reducing the likelihood of damage to the matrix of the composite structural members 50, 52 if the structural members 50, 52 are loaded or stressed against the fastener 10.

Figure 4:
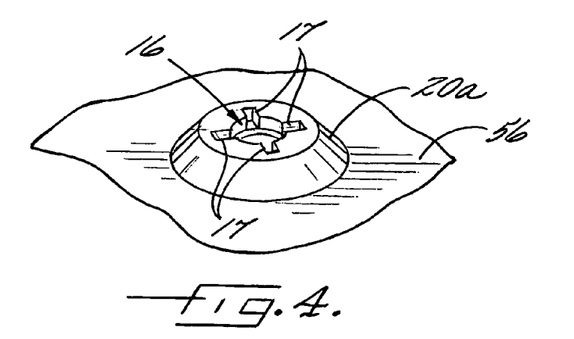
FIG. 4 is a perspective view illustrating the second head details of a composite-metallic hybrid fastener according to another embodiment of the present invention.
Figure 5:
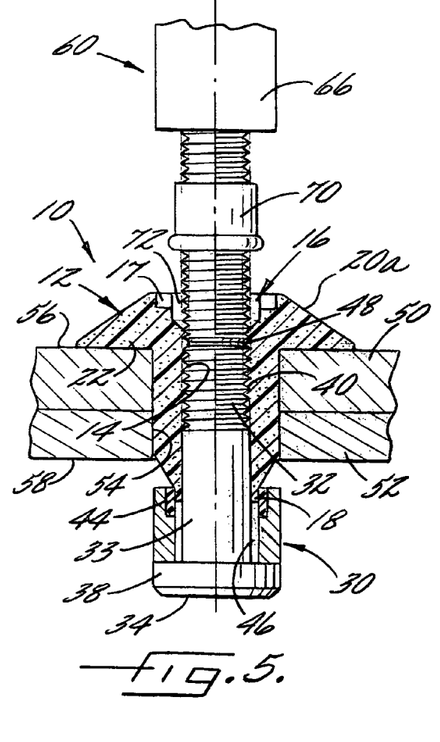
FIG. 5 is a section view illustrating the composite-metallic hybrid fastener of FIG. 4 disposed through two structural members.
Figure 6:
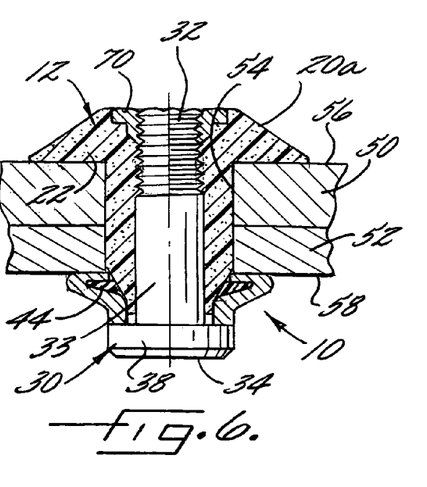
FIG. 6 is a section view illustrating the composite-metallic hybrid fastener of FIG. 4 after the first head of the fastener has been deformed and the locking ring has been installed.

It is also appreciated that the members of the fastener 10 can alternatively be structured in various other configurations. For example, FIGS. 4–6 illustrate a fastener 10 according to another embodiment of the present invention. The aperture 54 through the structural members 50, 52 defines a generally uniform diameter throughout, and the fastener 10 is structured to be disposed in the aperture 54 with a second side 20a of the sleeve 12 having a rounded configuration and protruding from the surface 56 of the structural member 50. Further, the shank 32 of the stem 30 is threaded only partially, i.e., the shank 32 defines an unthreaded portion 33 extending from the head 38 of the stem 30 partially to the breakneck feature 48. As described above, the sleeve 12 can define slots 17 or torque recess features (FIG. 4) for mating or engaging with the outer portion 66 of the tool 60 during installation so that the tool 60 can be used to prevent the sleeve 12 from rotating as torque is applied during the installation of the fastener 10. Thus, the shank 32 can be rotated relative to the sleeve 12, as described above in connection with FIGS. 2 and 3, during the installation process in order to deform the head 38.

As shown in FIGS. 5 and 6, the fastener 10 can also include a locking ring 70 for engaging the stem 30 and the sleeve 12, i.e., by securing the stem 30 to the sleeve 12 and/or forming a seal therebetween. The locking ring 70 can be any one of various types or designs of conventional members. For example, the locking ring 70 can be an annular member that is disposed on the stem 30 at the second side 20a of the sleeve 12 and pressed into a gap 72 between the shank 32 and the aperture 16 of the sleeve 12 by the tool 60 during installation. Thus, the locking ring 70 can secure the stem 30 to the sleeve 12 to prevent the two components 12, 30 from separating after installation. Additionally or alternatively, the locking ring 70 can seal the gap 72 to prevent the flow of fluid through the aperture 16. The locking ring 70 is typically formed of a metallic material such as stainless steel or titanium, and the locking ring 70 can be pre-coated as described above. It is appreciated that the locking ring 70 can be used in conjunction with other embodiments of the fastener 10, such as the embodiment illustrated in FIGS. 1–3.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A composite-metallic hybrid fastener for installation in an aperture through structural members for fastening the structural members, the fastener comprising:
   a metallic stem defining a shank extending between first and second ends, the stem defining an integrated deformable first head at the first end of the shank, such that the shank and the deformable first head are a single integral unitary metal member; and
   a composite sleeve defining first and second sides, a second head at the second side, and an aperture extending between the first and second sides, the second head having a cross-sectional dimension greater than a cross-sectional dimension of the aperture through the structural members,
   wherein the shank is configured to be disposed through the apertures of the structural members and the sleeve, and the first head is adapted to be urged toward the sleeve and thereby deformed to a cross-sectional dimension greater than the cross-sectional dimension of the aperture through the structural members such that the structural members are fastened between the first and second heads of the stem and the sleeve.

2. A fastener according to claim 1 wherein the aperture through the sleeve is threaded and the shank of the stem defines corresponding threads such that the shank is configured to be screwed into the sleeve and the first head is configured to be urged toward the sleeve and deformed against the sleeve by rotating the stem relative to the sleeve.

3. A fastener according to claim 1 wherein at least one of the stem and the sleeve are pre-coated with a curable organic coating.

4. A fastener according to claim 1 wherein the first head defines an annular portion extending around the shank, the annular portion being adapted to deform to a cross-sectional dimensional size at least as great as the cross-sectional dimensional size of the aperture.

5. A fastener according to claim 1 wherein the stem defines a breakneck feature such tat the stem is configured to fail at the breakneck feature after the first head has been filly deformed.

6. A fastener according to claim 1 wherein the metallic stein is formed of at least one of the group consisting of titanium and titanium-alloy materials.

7. A fastener according to claim 1 wherein the composite sleeve comprises fibers disposed in a polymeric resin matrix, the fibers being formed of at least one of the group consisting of carbon and fiberglass.

8. A fastener according to claim 1 wherein the composite sleeve comprises fibers disposed in a polyetheretherketone matrix, the fibers being formed of at Least one of the group consisting of carbon and fiberglass.

9. A fastener according to claim 1 further comprising a plastic insert disposed between the stem and the sleeve and configured to form a seal therebetween when the first head is deformed.

10. A fastener according to claim 1 further comprising an annular metallic locking ring disposed between the stem and the sleeve and configured to be engaged therebetween.

11. A fastener according to claim 1 wherein the deformable first head is configured to contact no more than one of the structural members when installed.

12. A fastener according to claim 11 wherein the composite sleeve is configured to extend entirely through the structural members when installed.

13. A blind composite-metal hybrid fastener for fastening structural members defining an aperture extending between first and second sides of the structural members, the fastener comprising:
   a metallic stem defining a shank extending between first and second ends, the stem defining an integrated deformable first head connected to the first end of the shank such that the shank and the deformable first head are a single integral unitary metal member; and a composite sleeve defining first and second sides, a second head at the second side of the sleeve, and an aperture extending between the first and second sides, the second head having a cross-sectional dimension greater than a cross-sectional dimension of the aperture through the structural members, wherein the first head defines a cross-sectional dimension less than the cross-sectional dimension of the aperture such that the first head is configured to be inserted through the aperture of the sleeve and the structural members from the first side to the second side of the structural members and thereafter deformed to a cross-sectional dimension greater than the cross-sectional dimension of the aperture by a blind relative adjustment between the second head and the shank at the first side of the structural members, thereby fastening the structural members between the first and second heads.

14. A blind composite-metal hybrid fastener according to claim 13 wherein the second head is formed of the composite material.

15. A blind composite-metal hybrid fastener according to claim 14 wherein the composite material comprises fibers disposed in a polymeric resin matrix, the fibers being formed of at least one of the group consisting of carbon and fiberglass.

16. A blind composite-metal hybrid fastener according to claim 14 wherein the composite material comprises fibers disposed in a polyetheretherketone matrix, the fibers being formed of at least one of the group consisting of carbon and fiberglass.

17. A blind composite-metal hybrid fastener according to claim 13 wherein the sleeve defines an aperture that is at least partially threaded and the shank defines threads corresponding to the threaded aperture of the sleeve such that the shank is configured to be screwed into the sleeve and compressed toward the sleeve by rotation of the shank relative to the sleeve.

18. A blind composite-metal hybrid fastener according to claim 13 wherein at least a portion of the fastener is precoated with a curable organic coating.

19. A blind composite-metal hybrid fastener according to claim 13 wherein the shank defines a breakneck feature such that the shank is configured to fail at the breakneck feature after the first head bas been fully deformed.

20. A blind composite-metal hybrid fastener according to claim 13 wherein the shank is fanned of a metallic material.

21. A blind composite-metal hybrid fastener according to claim 13 wherein the shank is formed of at least one of the group consisting of titanium and titanium-alloy materials.

22. A blind composite-metal hybrid fastener according to claim 13 wherein the first head defines an annular portion extending around the shank, the annular portion being adapted to deform to a cross-sectional dimensional size at least as great as the cross-sectional dimensional size of the aperture.

23. A blind composite-metal hybrid fastener according to claim 13 further comprising a plastic insert disposed between the stem and the sleeve and configured to form a seal therebetween when the first head is deformed.

24. A blind composite-metal hybrid fastener according to claim 13 further comprising an annular metallic locking ring disposed between the stem and the sleeve and configured to be engaged therebetween.

25. A blind composite-metal hybrid fastener according to claim 13 wherein at least a portion of the fastener is formed of at least one of the group consisting of titanium and titanium-alloy materials.

26. A blind composite-metal hybrid fastener according to claim 13 wherein the deformable first head is configured to contact no more than one of the structural members when installed.

27. A blind composite-metal hybrid fastener according to claim 13 wherein the composite sleeve is configured to extend entirely through the structural members when installed.

* * * * *

UNITED STATES PATENT AND TRADEMARK OFFICE
CERTIFICATE OF CORRECTION

PATENT NO. : 7,150,594 B2
APPLICATION NO. : 10/796364
DATED : December 19, 2006
INVENTOR(S) : Keener It is certified that error appears in the above-identified patent and that said Letters Patent is hereby corrected as shown below:

Title page,

Item 56, References Cited, U.S. PATENT DOCUMENTS, insert the following:

| | | |
|---|---|---|
| --2,510,693 | 06/1950 | Green |
| 2,887,003 | 05/1959 | Brilmyer |
| 3,107,572 | 10/1963 | Orloff |
| 3,262,353 | 07/1966 | Waeltz et al. |
| 3,390,601 | 07/1968 | Summerlin |
| 4,127,345 | 11/1978 | Angelosanto et al. |
| 4,211,145 | 07/1980 | Dolch |
| 4,312,613 | 01/1982 | Binns |
| 4,348,140 | 09/1982 | Bergholz et al. |
| 4,451,189 | 05/1984 | Pratt |
| 4,478,544 | 10/1984 | Strand |
| 4,595,324 | 06/1986 | Sadri |
| 4,815,906 | 03/1989 | Binns |
| 4,832,548 | 05/1989 | Strobel |
| 4,865,792 | 09/1989 | Moyer--. |

UNITED STATES PATENT AND TRADEMARK OFFICE
CERTIFICATE OF CORRECTION

PATENT NO. : 7,150,594 B2
APPLICATION NO. : 10/796364
DATED : December 19, 2006
INVENTOR(S) : Keener It is certified that error appears in the above-identified patent and that said Letters Patent is hereby corrected as shown below:

Title page,

Item 56, References Cited, U.S. PATENT DOCUMENTS (continued), insert the following:

| | | |
|---|---|---|
| --4,967,463 | 11/1990 | Pratt |
| 5,066,179 | 11/1991 | Pratt |
| 5,153,978 | 10/1992 | Simmons |
| 5,195,855 | 03/1993 | Atkinson et al. |
| 5,238,342 | 08/1993 | Stencel |
| 5,256,017 | 10/1993 | Smirnov et al. |
| 5,350,264 | 09/1994 | Stencel |
| 5,361,483 | 11/1994 | Rainville et al. |
| 5,498,110 | 03/1996 | Stencel et al. |
| 5,634,751 | 06/1997 | Stencel et al. |
| 5,680,690 | 10/1997 | Briles et al. |
| 5,810,530 | 09/1998 | Travis |
| 5,947,667 | 09/1999 | Cassatt et al. |
| 6,036,418 | 03/2000 | Stencel et al. |
| 6,221,177 | 04/2001 | Keener |
| 6,274,200 | 08/2001 | Keener et al. |
| 6,350,092 | 02/2002 | Powell--. |

UNITED STATES PATENT AND TRADEMARK OFFICE
CERTIFICATE OF CORRECTION

PATENT NO. : 7,150,594 B2
APPLICATION NO. : 10/796364
DATED : December 19, 2006
INVENTOR(S) : Keener It is certified that error appears in the above-identified patent and that said Letters Patent is hereby corrected as shown below:

Title page,

Item 56, References Cited, U.S. PATENT DOCUMENTS (continued), insert the following:

| --6,403,230 | 06/2002 | Keener |
|---|---|---|
| 2,099,678 | 11/1937 | Curtis |
| 2,365,372 | 12/1944 | Allen |
| 2,432,986 | 12/1947 | Forman |
| 2,493,452 | 01/1950 | Grigg |
| 2,525,736 | 10/1950 | Taylor |
| 3,013,643 | 12/1961 | Perry |
| 3,014,563 | 12/1961 | Bratton |
| 3,085,461 | 04/1963 | Forman |
| 3,128,999 | 04/1964 | Schmitt |
| 3,193,237 | 07/1965 | Adams |
| 3,302,510 | 02/1967* | Gapp |
| 3,307,731 | 03/1967 | Seltzer |
| 3,345,901 | 10/1967 | Brosseit |
| 3,348,444 | 10/1967 | Brignola |
| 3,489,312 | 01/1970 | Hunckler et al.--. |

UNITED STATES PATENT AND TRADEMARK OFFICE
CERTIFICATE OF CORRECTION

| | |
|---|---|
| PATENT NO. | : 7,150,594 B2 |
| APPLICATION NO. | : 10/796364 |
| DATED | : December 19, 2006 |
| INVENTOR(S) | : Keener |

It is certified that error appears in the above-identified patent and that said Letters Patent is hereby corrected as shown below:

Title page,

Item 56, References Cited, U.S. PATENT DOCUMENTS (continued), insert the following:

| --3,535,136 | 10/1970 | Beene |
|---|---|---|
| 4,117,261 | 09/1978 | Blevins et al. |
| 4,237,768 | 12/1980 | Volkmann |
| 4,364,697 | 12/1982 | Binns |
| 4,405,256 | 09/1983 | King Jr. |
| 4,490,083 | 12/1984 | Rebish |
| 4,521,147 | 06/1985 | King et al. |
| 4,687,394 | 08/1987 | Berecz |
| 4,587,395 | 08/1987 | Berecz |
| 4,687,396 | 08/1987 | Berecz |
| 4,687,397 | 08/1987 | Berecz |
| 4,687,398 | 08/1987 | Berecz |
| 4,767,248 | 08/1988 | Pratt |
| 4,949,450 | 08/1990 | Scharres |
| 5,051,636 | 09/1991 | Ishimoto et al. |
| 5,092,727 | 03/1992 | Moghe |
| 5,114,290 | 05/1992 | Moghe |
| 5,253,962 | 10/1993 | Close, Jr.--. |

UNITED STATES PATENT AND TRADEMARK OFFICE
CERTIFICATE OF CORRECTION

PATENT NO.        : 7,150,594 B2
APPLICATION NO.   : 10/796364
DATED             : December 19, 2006
INVENTOR(S)       : Keener It is certified that error appears in the above-identified patent and that said Letters Patent is hereby corrected as shown below:

Title page,

Item 56, References Cited, U.S. PATENT DOCUMENTS (continued), insert the following:

| | | |
|---|---|---|
| --5,314,282 | 05/1994 | Murphy et al. |
| 5,620,287 | 04/1997 | Pratt |
| 5,860,780 | 01/1999 | Lenac et al. |
| 5,902,535 | 05/1999 | Burgess et al. |
| 6,023,891 | 02/2000 | Robertson et al. |
| 6,287,064 | 09/2001 | Jhumra et al. |
| 6,471,179 | 10/2002 | Tousi et al. |
| 6,979,129 | 12/2005 | Farbaniec et al. |
| 2002/0172576 | 11/2002 | Keener |
| 2005/0238456 | 10/2005 | Stinson |
| 2006/0062650 | 03/2006 | Keener--. |

Title page, Item 56, References Cited,
Insert the following:
    --FOREIGN PATENT DOCUMENTS
EP 0 258 477            03/1988          Tiodize Company Inc--;

OTHER PUBLICATIONS, insert the following:
--PCT Search Report for PCT/US2005/027766 dated January 2, 2006--.

UNITED STATES PATENT AND TRADEMARK OFFICE
CERTIFICATE OF CORRECTION

| | |
|---|---|
| PATENT NO. | : 7,150,594 B2 |
| APPLICATION NO. | : 10/796364 |
| DATED | : December 19, 2006 |
| INVENTOR(S) | : Keener |

It is certified that error appears in the above-identified patent and that said Letters Patent is hereby corrected as shown below:

Column 10,
Line 32, "tat" should read --that--;
Line 34, "filly" should read --fully-;
Line 36, "stein" should read --stem--;
Line 44, "Least" should read --least--.

Column 12,
Line 6, "fanned" should read --formed--.

Signed and Sealed this

Twenty-ninth Day of May, 2007

JON W. DUDAS
*Director of the United States Patent and Trademark Office*